Figure 12:
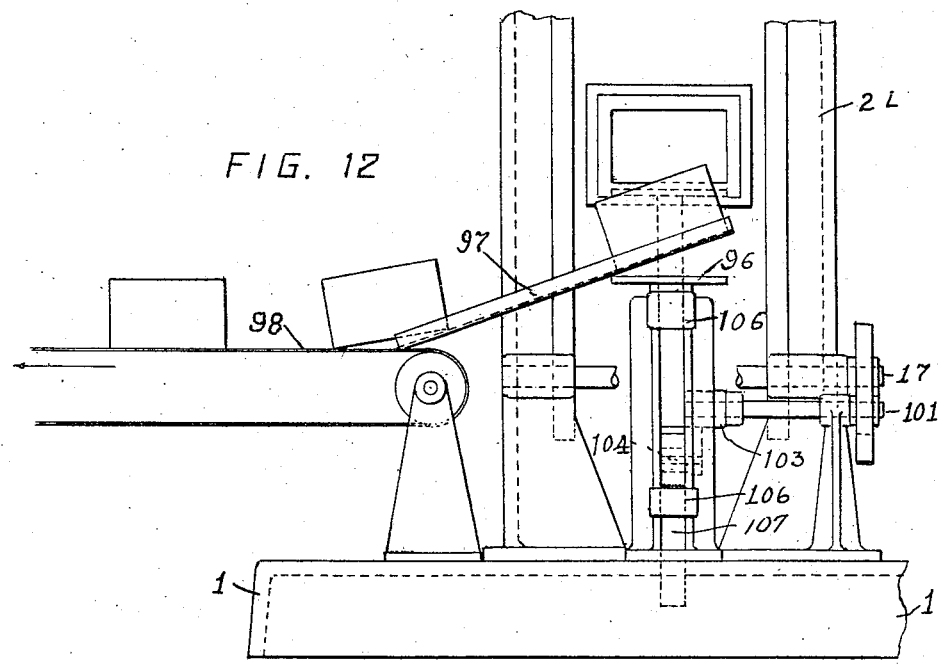

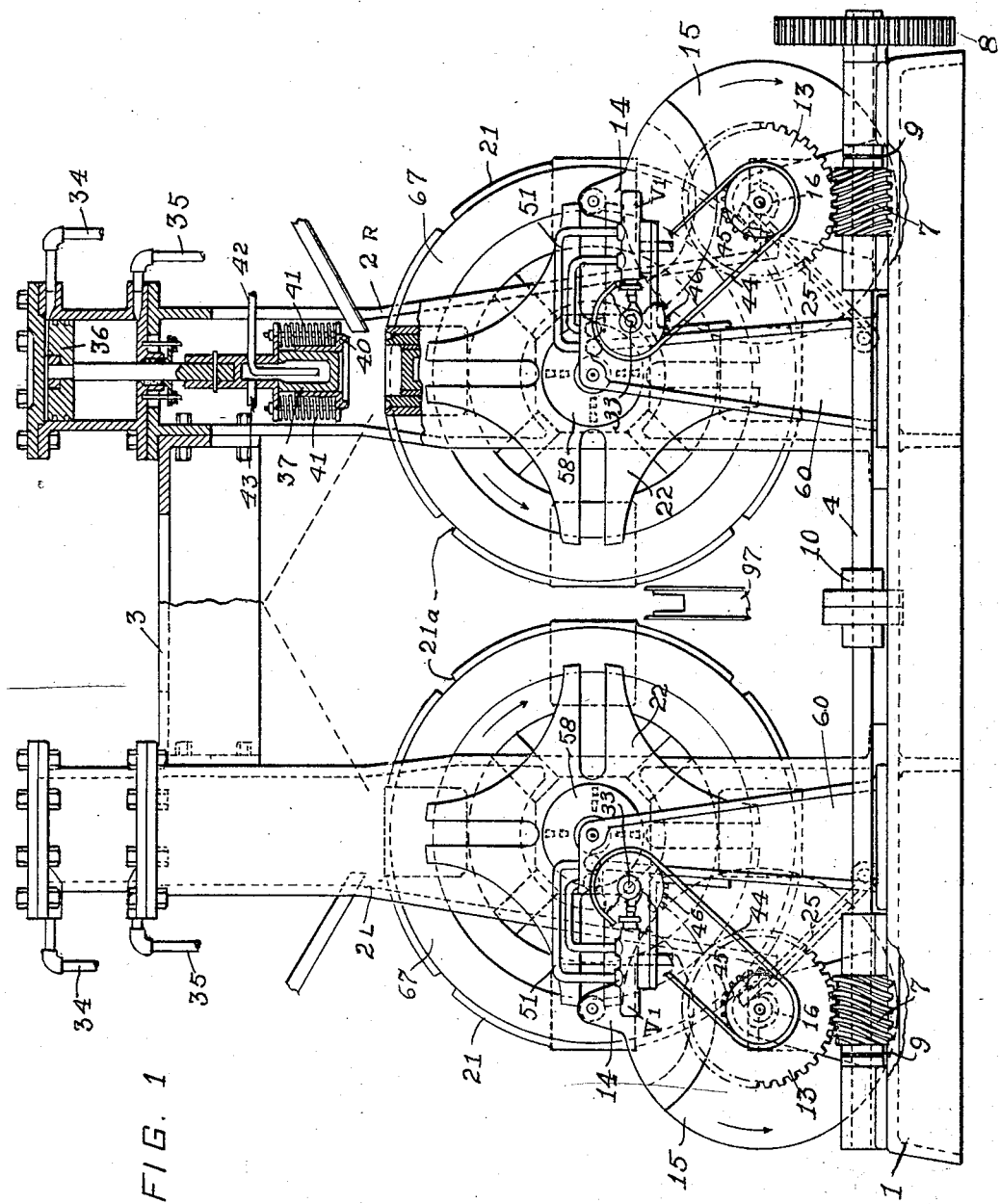

March 9, 1943.  W. S. MAYERS  2,313,160
MACHINE AND METHOD FOR FORMING AND WELDING HOLLOW GLASS BLOCKS
Filed Sept. 3, 1937  8 Sheets-Sheet 2
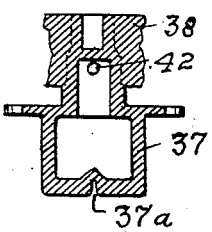
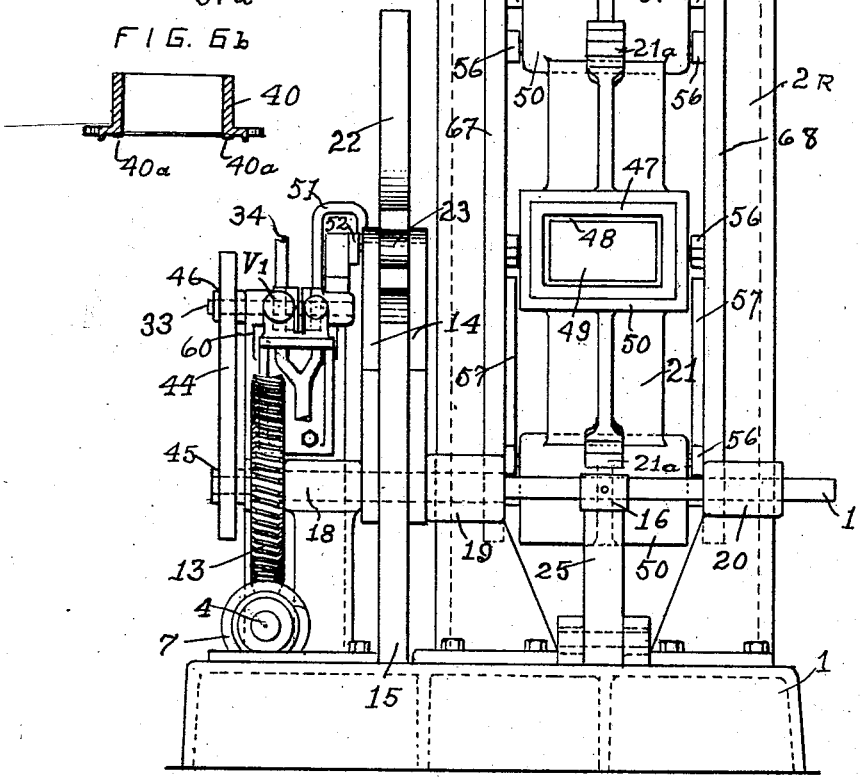
INVENTOR
William S. Mayers March 9, 1943. W. S. MAYERS 2,313,160
MACHINE AND METHOD FOR FORMING AND WELDING HOLLOW GLASS BLOCKS
Filed Sept. 3, 1937 8 Sheets-Sheet 3

FIG. 3

INVENTOR
Wilbur S. Mayers
by
*[Attorney signature]*
Attorney

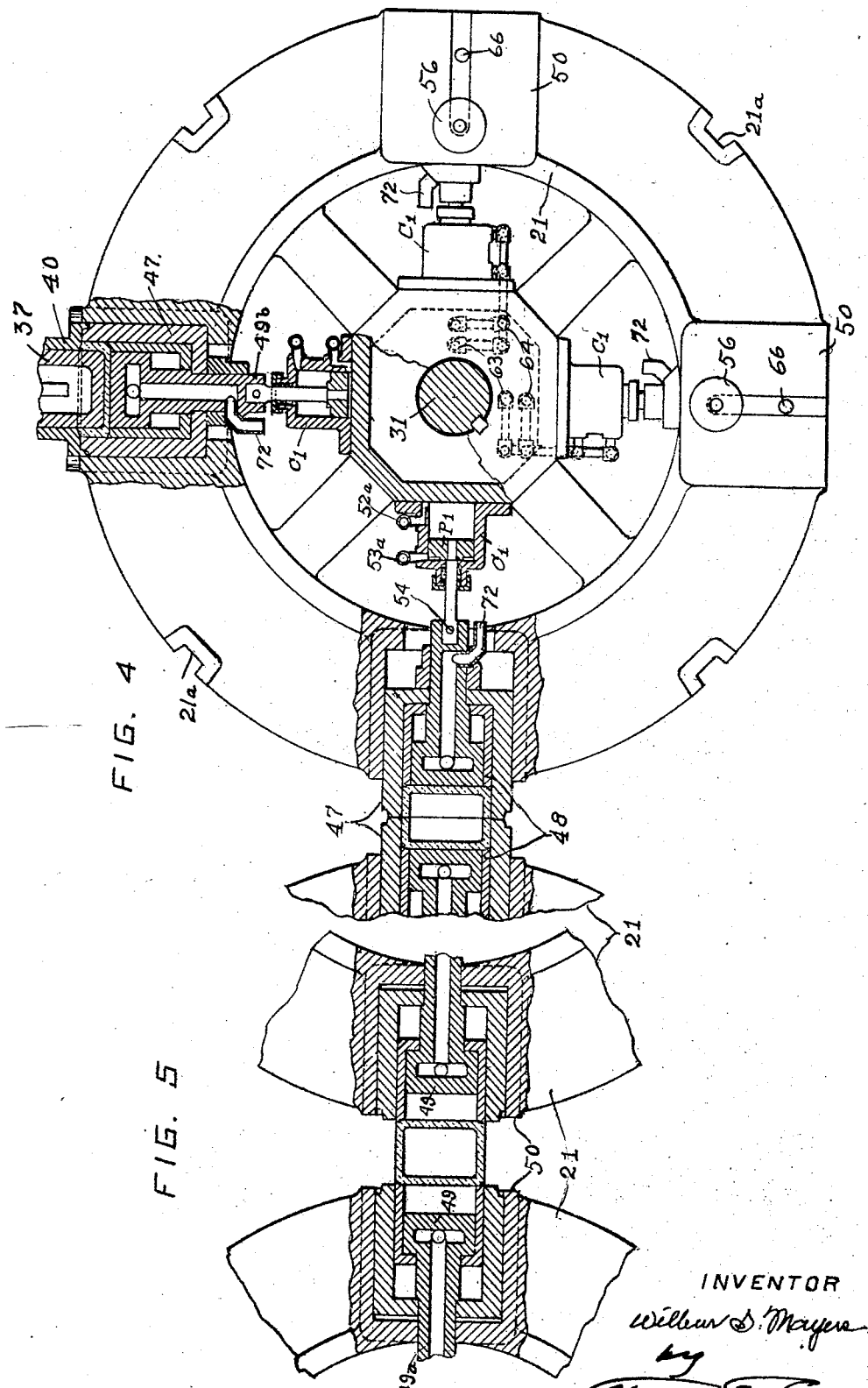

March 9, 1943.    W. S. MAYERS    2,313,160
MACHINE AND METHOD FOR FORMING AND WELDING HOLLOW GLASS BLOCKS
Filed Sept. 3, 1937    8 Sheets-Sheet 5
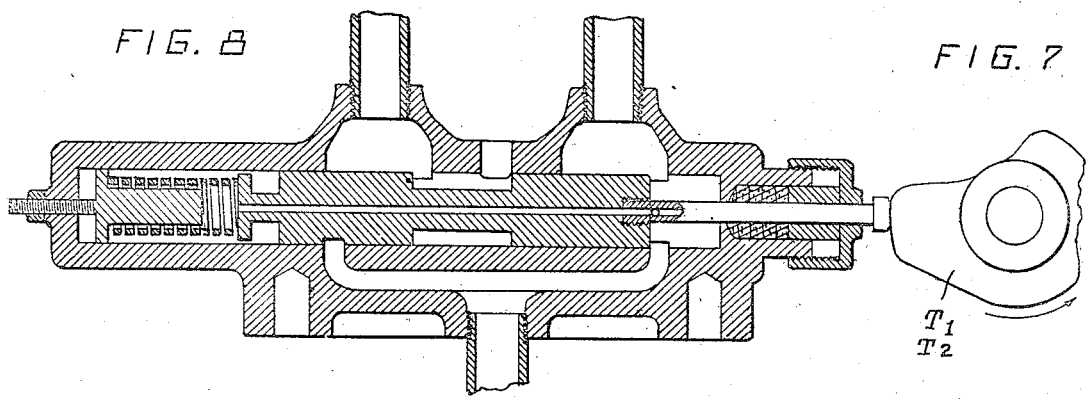
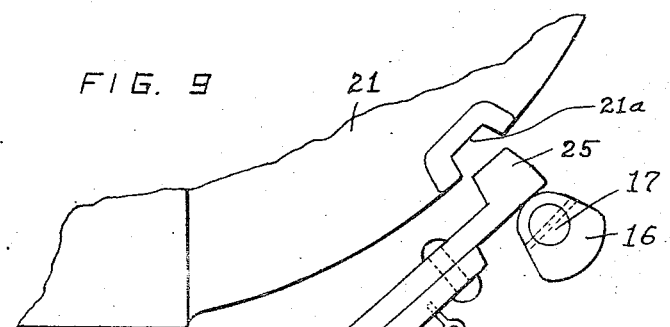
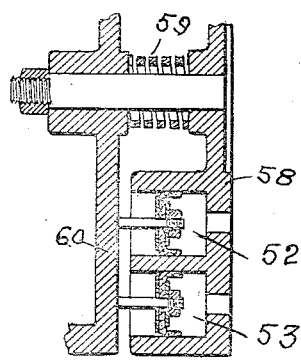
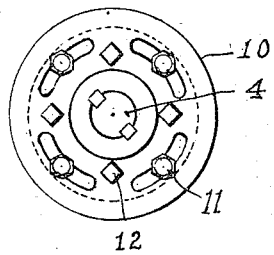
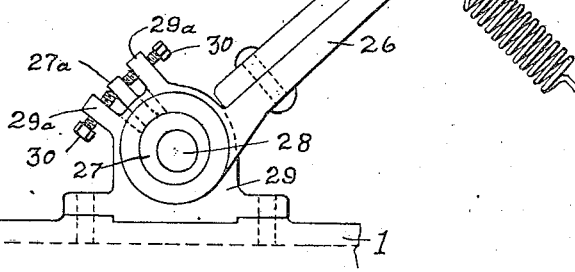
INVENTOR
William S. Mayers March 9, 1943.  W. S. MAYERS  2,313,160
MACHINE AND METHOD FOR FORMING AND WELDING HOLLOW GLASS BLOCKS
Filed Sept. 3, 1937  8 Sheets-Sheet 8

INVENTOR
Wilbur S. Mayers
by
Faust & Crampton
Attorney

Patented Mar. 9, 1943

2,313,160

UNITED STATES PATENT OFFICE 2,313,160

MACHINE AND METHOD FOR FORMING AND WELDING HOLLOW GLASS BLOCKS

Wilbur S. Mayers, Toledo, Ohio

Application September 3, 1937, Serial No. 162,237

16 Claims. (Cl. 49—1)

This invention relates to machines for pressing articles from globules or gobs of molten glass which are deposited in molds in regular succession and in completely automatic operation.

The machine is specifically adapted for forming hollow blocks of glass which are used principally in the construction of transparent walls in buildings.

In the present state of the art, these blocks are formed by joining the rims of two similar pan shaped components, thus forming hollow blocks which may be rectangular in shape or in other desired forms.

Up to the present time, these half blocks have been molded and then joined together in subsequent operations by various methods involving a considerable amount of hand work which necessarily limits the speed of production and adds to the manufacturing costs. Furthermore, the blocks so made and joined most often do not register perfectly at the junction of the two parts which is a distinct disadvantage when building them into walls.

The object of my invention is to provide methods and means for doing away with all hand work in joining the halves of the blocks and to attain practically perfect registry at their junction with one another, the blocks being delivered by the machine as a finished product and after being annealed they are ready for the market.

To accomplish this result, I employ co-acting twin pressing machines which, contrary to the established custom, contain mold carriers which are supported wholly by and rotate upon horizontal shafts, the two pressing machines being in working relation and in directional opposition, one to the other. The mold carriers are actuated simultaneously and may be identical in their component parts, the rotation and welding parts of one, however, being in the opposite direction from the other.

The supply of the molten glass mold charges at timed intervals requires either two feeders of any well known type, set with right and left deliveries opposite the ends of the machine base or a single feeder with double orifice and delivery set on the centerline between the machine pair, the mold charges in either case being delivered simultaneously and deflected by adequate chutes, or by other means to the molds. In this construction there are four molds in each carrier, each placed with their centers upon radial lines 90 degrees from one another and upon common radial planes. Thus while the edges of the molds at the tops and bottoms of the carriers, while stationary, coincide with horizontal planes, those at the sides coincide with vertical planes, all parallel with the axes of the rotating carriers.

In operation, while the two molds at the tops of their carriers, which at that moment are at rest, are receiving their charges of molten glass in which these are pressed into form, the rims of the adjacent molds registering with one another are, by means hereinafter described, caused to move toward one another until they are in contact under pressure, at which time the plastic rims firmly cohere causing perfect welding between the halves to take place. In a short interval of time the shells of the molds are caused to recede to their former positions but, by described means, the now welded block is held stationary during the recession of the mold shells from which it is then free, and finally the block holding means also recede a short distance allowing it to drop by gravity upon a vertically reciprocating plate from which it is delivered to a chute member and then sliding by gravity to a take-away conveyor, all the above operations taking place at the same time and during a rest period of the intermittently rotated carriers.

As the adjacent molds in their welding positions are in perfect register and as the welding is done while the halves are still within their respective molds, it is obvious that the finished blocks must emerge from their molds in perfect register and without distortion.

As the mechanical and structural members of the twin mold carriers are identical, one with the other, the distinctions between them residing in the opposed directions of certain moving parts, a description of one will apply to the other.

As the blocks become cooled by radiation their sealed-in air contents contract thus causing partial vacuums therein. As these vacuums build up, the walls of the blocks are gradually losing their plasticity so that they do not collapse due to atmospheric pressure. In all pressed glassware, the outer surfaces are chilled by contact with the much colder mold walls, forming temporarily rigid jackets around their molten interiors which is an important factor in the prevention of distortion. The degree of chilling the glass surfaces may be regulated by adjusting the flow of the mold cooling medium through means herein described. In cases where it is desired that the blocks should have exceptionally thin walls, insurance against possible distortion by atmospheric pressure is provided by means hereinafter disclosed.

Figure 13:
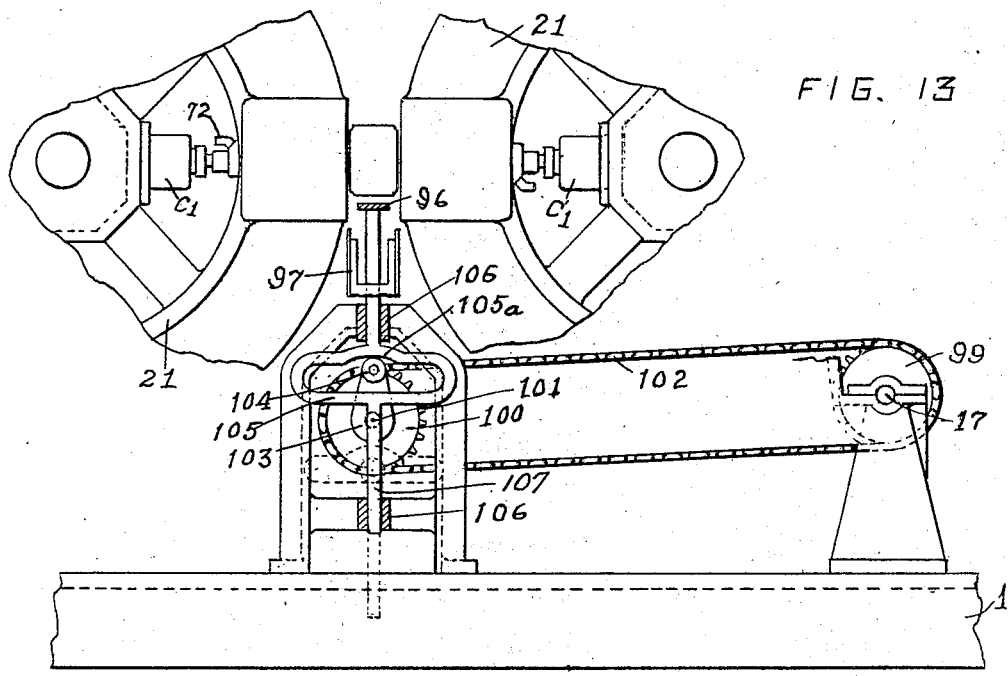
Figure 14:
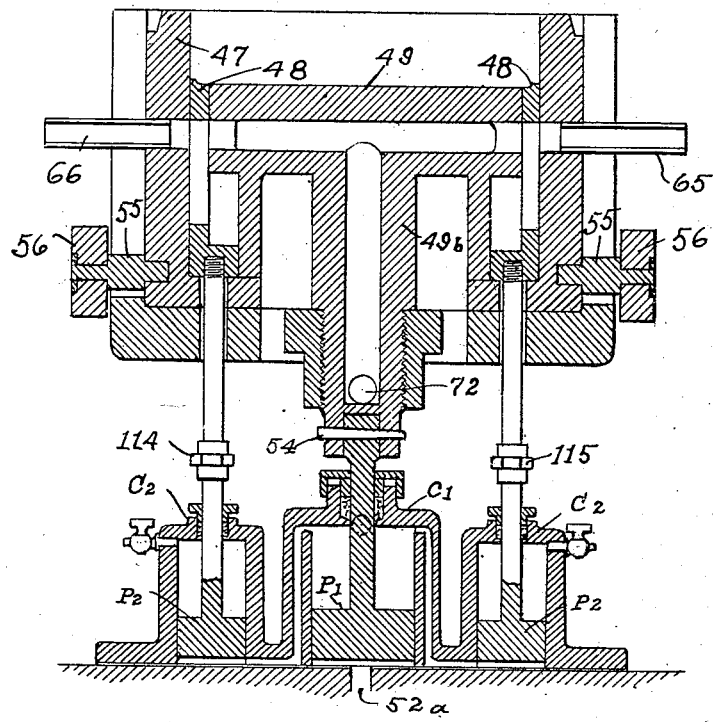
Figure 15:
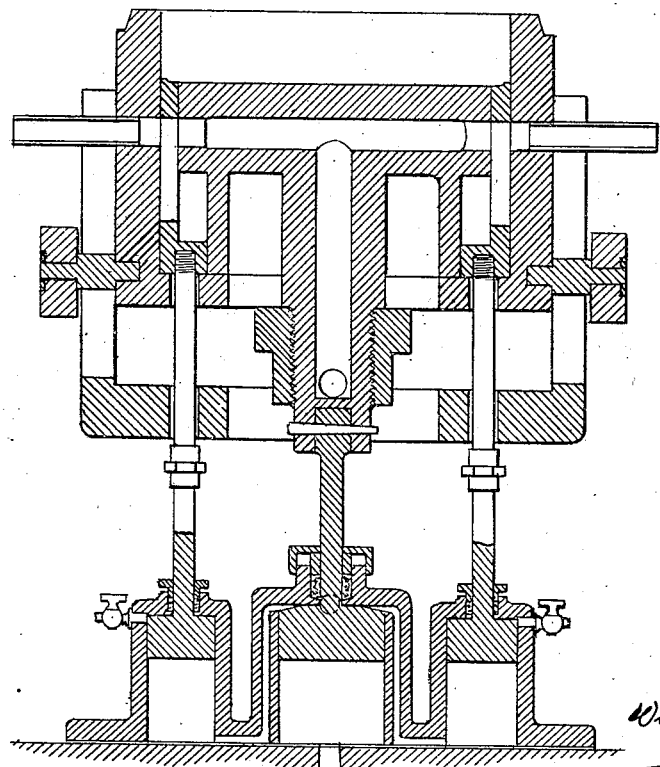
Figure 18:
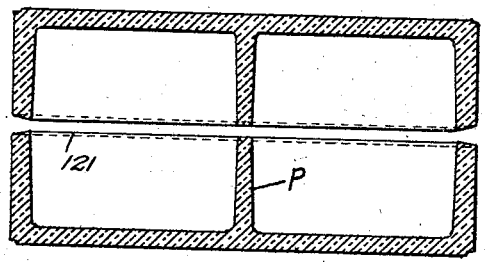
Figure 21:
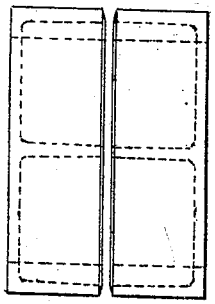
Figure 19:
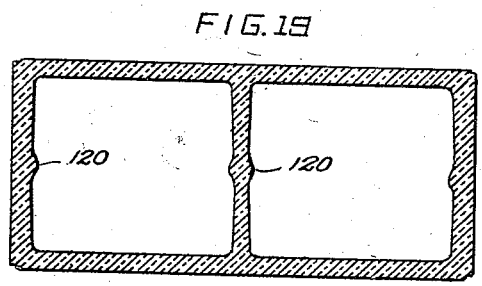
Figure 20:
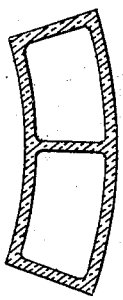
Figure 22:
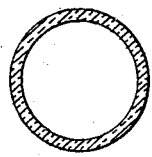
Figure 16:
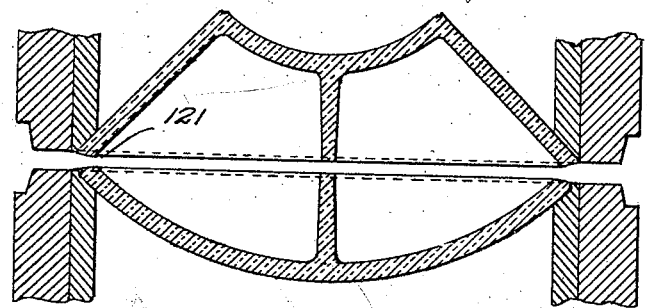
Figure 17:
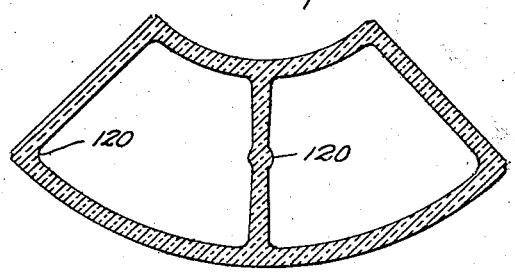

With reference to the drawings, Fig. 1 is a front elevation showing the twin pressing and molding machines mounted upon their common base and joined by a top connecting member; Fig. 2 is an end elevation showing the right hand pressing and molding machine; Fig. 3 is a combined plan and horizontal section of the right hand machine, the part section being taken on the axis of the mold carrier; Fig. 4 is an elevation of the right hand mold carrier with a fragmentary portion sectionalized upon the radial center plane; Fig. 5 is a fragmentary section on their radial centerplane of both right and left mold carriers; Fig. 6 is a fragmentary vertical centerplane section through a pressing plunger; Fig. 6b is a vertical centerplane section through a mold cap; Fig. 7 is a fragmentary elevation of a pneumatic timer cam; Fig. 8 is a vertical centerplane section through a pneumatic piston valve; Fig. 9 is an enlarged detail of a mold carrier aligning device; Fig. 10 is an elevation of the drive shaft coupling; Fig. 11 is a horizontal centerplane section through an automatic hold-down of a pneumatic distributing disk; Fig. 12 is a transverse part elevation showing the finished block lowering device; Fig. 13 is a part front elevation showing the lowering device; Figures 14 and 15 show radial centerplane sections of a mold in two stages of the welding cycle; Figures 16 and 17 show sections of curved face block halves before and after welding; Figures 18 and 19 show sections of straight face block halves before and after welding; Figures 20, 21, and 22 show sections of curved face blocks in which the welding planes are at midway points and pass through the curved faces at right angles thereto.

The structural member of the twin machine comprises the common base 1, the frames 2R, 2L, and the top connecting member 3. The frame bases are doweled and securely bolted to the base and the ends of the top connecting member are bolted rigidly to the frames. In the frames, and integral parts thereof, are the housings for the driven shafts and cooling medium collectors hereinafter described.

The drive shaft 4 is journaled in the bearings 5, 6 and keyed to the worms 7, it being understood that the same numerical reference character applies to like parts in both the right and left hand machines.

The spur gear 8 may be keyed to either end of the drive shaft and is driven through suitable intermediate gearing by a motor, not shown. On the drive shaft at the ends of the worms are the ball or roller thrust bearings 9. The drive shaft is in two pieces of equal length which are keyed to their respective halves of the coupling 10. The contacting rims of the coupling halves have small radial grooves, as shown in Fig. 3, each registering with the other, providing circumferential adjustment in small angles so that when clamped together by the bolts 11 non-slippage is secured. The coupling flanges are slotted, as in Fig. 10, for the bolts 11 so that this angular adjustment may be made.

The set screws 12 are for the purpose of separating the halves, sliding one or the other on its shaft, when such adjustment is to be made.

The worms, in right and left hand pair, mesh with the worm gears 13 which are thus driven in opposite rotative directions. The worm gears, the roller arms 14, roller disks 15 and cams 16 are each keyed to the intermediate shafts 17 and these shafts are journaled in the bearings 18, 19, 20, preferably of the roller type.

For driving the mold carriers 21 in intermittent stages the well known Geneva gears 22 are employed, each having four teeth, as shown.

It will be observed that for each rotation of the intermediate shafts the Geneva gears make a quarter turn and that their dwell period is three fourths of the time in which the intermediate shafts make one rotation. In order to secure ample strength of the parts the gear driving rollers 23 are journaled on the pins 24 which are tightly fitted at both ends between and into the double arms 14.

After becoming worn to a more or less extent, the Geneva gears may not, due to lost motion, place the opposed molds in the welding position in precise register, nor the top molds in accurate line with the plungers. To guard against this condition, there are provided the wedge shape stops 25. These stops are preferably of hardened steel and have integrally extended shanks which are riveted to the rocker arms 26. These rocker arms are fulcrumed on the bushings 27 which have a slight eccentricity on their shafts 28. Extending upwardly from the bearings 29 are two lugs 29—a and between them are the short arms 27—a which are integral with the bushings 27. The screws 30 are threaded into the lugs 29—a and engage the eccentric arms 27—a. By adjusting these screws the eccentrics may be rotated a limited amount of their shafts thus increasing or diminishing the distance between the shaft centers and the stops 25, affording great precision of adjustment. The stops, when raised by the cams 16, enter the notches 21—a in close contact therewith so that there is no lost motion between these parts. The cams 16 are pinned upon the shafts 17 in working relation to the other members mounted upon the shafts in such manner that the locking arms are raised and lowered only during the dwell periods of the Geneva gears.

The mold carriers are mounted upon and keyed to their shafts 31, these shafts being journaled, preferably with roller bearings 32 fitted on housings in the frames 2R, 2L. These shafts are centered so that, during a dwell period, the distance between the adjacent mold edges is a predetermined amount greater than the thickness of the glass blocks to be manufactured. By the provision of certain features and the modification of others this distance may be made variable without affecting the method of operation. The mold housings may be made separable from their carriers so that different forms and sizes may be used without affecting the method.

*Pressing operation*

During the dwell periods the upper molds on both carriers are in positions to receive their charges of molten glass which are formed and conveyed to them by any suitable and well known means.

The timer cam T—1 is so positioned upon its shaft 33 that, through the timer pneumatic valve V—1, air pressure is admitted through the pipes 34 immediately after the molds have simultaneously received their charges. This action causes both pistons 36 and plungers 37 to descend into their molds with adequate force by which the half blocks are pressed into form. Remaining in the molds for a predetermined length of time for cooling the glass the cam T—1 now reverses the valve V—1 admitting air pressure in the pipes 35 with exhaust in the pipes 34, thus causing the plungers to rise clear of the molds.

For the purpose of maintaining accurate alignment with the molds, the plunger holders are provided with crossheads 38 which slide upon guides 39 fixed to the machine frames. The mold caps 40 have box-like upward extensions machined to an easy fit over the plunger bodies so that the caps will remain in alignment. The cap springs 41 cause the caps to be seated a short time before the plungers reach their lowest points.

A cooling medium, preferably water, enters the hollow plunger interiors through the inlet pipes 42, and passes out through the outlet pipes 43, all having rubber hose connections with a supply pipe, not shown.

It is obvious that the timing of both plungers as well as the mold parts may be done by either of the combinations shown in Fig. 1 or the two may be placed in synchronism with independent operations and connections. The timer shafts 33 are shown as being driven by chains 44 on sprocket wheels 45, 46 having one to one ratios, this arrangement economizing space. Air pressure is admitted to the valve V—1 through its lower pipe connection. Fig. 8 shows a preferred type of balanced valve with spring return but any type of 3-way valve and closed or box cam may be substituted without affecting the operation.

For the purpose of preventing the sliding members of the molds from dropping to their outward positions by gravity during their travel below the horizontal center lines of the carriers, there are fitted to each mold shell the studs 55 upon which are journaled the rollers 56.

In the lower half of their circular path, these rollers engage the semi-circular guides 57 in rolling contact by which means the mold parts are held from sliding outwardly in their housings.

Welding operation

During each of the above described dwell periods and coincident with the pressing operations at the top molds, the welding operations take place at the adjacent side molds.

Each mold is made up of three parts comprising the shells 47, the ejectors 48 and the bottoms 49, all machined to easy sliding fits within the other in the order named. The exterior surfaces of the shells are machined to easy sliding fits in the carrier housings 50 which are integral with the carrier castings. The three members named form the matrices—the shells forming the edges and the ejectors and bottoms forming the bottoms of the half blocks. In the construction shown the shells 47 and the bottoms 49 are at all times rigidly connected together, the ejector 48 sliding between them.

In the pressing operation the mold parts are all within their housings, as shown at the top mold in Fig. 4. At the next stage, shown at the left in Fig. 4, the sliding mold members in both mold carriers have been forced outwardly by primary pneumatic means, hereinafter described, until the mold shells are in contact, in which operation the welding takes place. After a very short interval of time the shells are drawn inwardly by the reversal of this pneumatic force. At this part of the cycle, however, the ejectors 48 are held by a secondary pneumatic means in contact with the now welded block, the edges of which are exposed by the recession of the shells, as shown clearly in Fig. 5. At this juncture the shells have not quite reached the limit of their receding travel and the glass block is still held by the ejectors. Upon further recession, that is to say to their limits, the bottom members 49 impact with the inwardly extending flanges of the ejectors 48 causing them also to recede a sufficient amount to release the formed and welded block which then falls by gravity to conveying means.

In the latter operation it is understood that the primary pneumatic means, being much the stronger, overcome the secondary means, both being active at this time.

In detailed description of the pneumatic means above referred to, the timing valve V—2, is similar in construction and operation to the plunger timer V—1, shown in Fig. 8, and the cam T—2 is similar to the timer T—1 and on the same shaft.

At the beginning of the welding cycle air pressure is admitted through the pipe 51 to the automatic hold-down cylinder 52 from whence it is communicated through the pipes 52—a to the primary cylinders C—1, forcing the pistons P—1 outwardly and with them the mold parts 47, 48, 49.

Upon a further rotation of the timer cam T—2, the valve V—2 is reversed and air pressure is admitted through the automatic hold-down cylinder 53 and the pipes 53—a to the stuffing box ends of the primary cylinders C—1, thereby returning the pistons P—1 to their normal positions. It will be noted that the compressed air ducts 53—a lead from the tops of the primary cylinders C—1 to the bottoms of the secondary cylinders C—2 causing the secondary pistons P—2 and the mold ejectors 48 to remain in their outward positions. They will, however, resume their inward positions when the molds are nearing the pressing positions, due to their gravity.

Referring to Fig. 14, it is obvious that the outwardly moving piston P—1 will compress the confined air in the pair of cylinders C—2. These latter cylinders thus act as dash-pots for cushioning the outward travel of the mold parts, the cushioning effect being adjusted by opening or closing the relief cocks shown at the tops of the cylinders C—2.

In the final event of the welding cycle the timer cam T—2 returns its valve piston to its original position, which is at mid-stroke corresponding to the cylindrical surface of the cam where its radius is half way between its maximum and minimum radii, the valve ports being then closed. In Fig. 3 there is shown an alternate method of holding the ejectors 48 in contact with the block during the recession of the other mold members. In this device the secondary cylinders C—2 and pistons P—2 are omitted and are replaced by the ratchet members 109, pawl members 110, release pin members 111 and the springs 112. When the mold parts are forced outwardly the release pins are carried by the disks 113 along with the mold moving members. This releases the pawls 110 so that at the end of the outward movement the pawls engage the ratchet blocks 109, thus holding them and the ejectors 48 in contact with the ejected block. In returning to their normal positions the shells 47, near the ends of their receding travel, depress the release pins 111 disengaging the ratchets as shown in Fig. 3. The springs 112 are under compression between the mold housings 50 and the threaded flanged nuts 113 which are shown as threaded upon extensions from the ratchet blocks 109, thus providing spring tension adjustment. The purpose of these springs is to return the ejectors to their normal positions when the ratchets are released. The function and effect of the two described methods of holding and releasing the ejected blocks are identical and either may be substituted for the other.

Referring to Fig. 3, it is observed that the sliding mold members 47, 48, 49 may be disassembled from their housings by first removing the connecting pins 54, and the water outlet pipes 65, 66 and loosening the unions 114, 115.

In the final event of the welding cycle the timer cams T—2 return the valve pistons to their original position or mid-stroke, represented by the cylindrical surface of the cams which have a radius half way between their highest and lowest contacting surfaces, the valve inlet ports being then closed.

In order that the compressed air from the fixed external piping may be conducted to the quadrivial piping systems within the rotative mold carriers the plane machined surface of the disk 58 is held by the spring 59 under light pressure against a similar surface on the adjacent side of the Geneva gear wheels 22. During the dwell periods of the mold carriers the two ports in the disk 58 are in register with two corresponding ports, set in radial lines, in the Geneva gear hub as in Figures 1 and 3. To provide against leakage from the contacting surfaces of the disk and gear hubs the hold-down air cylinders 52, 53 are made integral parts of the disks and are fitted the cup leather pistons whose stems bear against the fixed standards 60. It will be seen that when the air pressure enters either of the pairs of cylinders, the area of the pistons being much greater than the area of the outlet ports, the disks will be held with strong pressure against the wheel hubs due to the reaction of the piston stems against the fixed supports 60.

The inner hubs of the Geneva gear wheels are in air-tight contact with the ends of the mold carrier hubs and in register through both of these members are the ducts 61, 62, four of each pair, positioned quadrantally, and each pair successively in register with the outlets from the cylinders 52, 53, as shown in dotted lines in Fig. 1. Pipes 63, 64 are led from each of the four pairs of ducts to the primary and secondary air cylinders C—1 and C—2 and connecting therewith in the manner above described.

For the purpose of cooling the molds, their bottom members 49 are made hollow so that the cooling medium, entering their tubular stems 49—b, divides laterally and discharges in equal volumes through the pipes 65, 66 into the overflow collecting rings 67, 68, C shape in section as shown in Fig. 3, from whence it flows through waste pipes.

The water, or other cooling medium passes from an external source through the rotary swivel joints 69 and the axial ducts 70 to the junctions of the four radial branch ducts leading through the pipes 71 to nozzles on the outside of the mold carrier hubs from whence it is conducted to the mold inlets 72 through short pieces of rubber hose, not shown.

The means for receiving each finished block and for lowering it to a level in which it clears the molds during the succeeding indexing period of the mold carriers without excessive drop by gravity comprises the vertically reciprocating plate 96, Figures 12, 13, the chute 97 and timed means for actuating the plate with relation to the mold carrier cycles.

In order that each block may be removed from the plate in timed relation to the movement of the mold carriers the chute is set at an angle of inclination which causes the block to slide thereon by gravity when the plate is lowered.

A rectangular section is cut from the bottom of the chute to permit the passage of the plate therethrough but leaving margins at the sides of the cut-away area. These margins extend under the edges of the block which slides thereupon, it being understood that the widths of the plate and chute opening are less than the thickness of the block, as shown in Fig. 13. At the bottom of the chute the block is carried away by any well known type of conveyor, such as the belt conveyor 98. The sprocket 99 is keyed on an extension of one of the intermediate shafts 17 and a similar sprocket, with one to one ratio, is keyed on the take-out shaft 101, these sprockets being geared together by the chain 102. The crank 103 has the roller 104 which moves within the closed cam, 105, which is guided by rods 107 through guides 106 thus imparting vertical reciprocating motion to the cam and to the connected plate 96 in synchronism with the movements of the mold carrier and other reciprocating members. The concaved section on the working surface of the upper half of the cam, 105—a, causes it and the plate to remain stationary during the short interval of time during which the finished block is deposited upon it.

It is well known that articles of hot glass in the plastic state will firmly cohere when brought together thus producing practically perfect welds. As the half blocks are entirely within the molds when brought together the seams at their plane of junction will show but slightly in the finished product with accurate coalignment of the molds.

In building the walls, the blocks may be laid with broken joints in the manner of ordinary clay brick. In order to strengthen the glass blocks at their midway points the integrally formed partitions P, Figures 16 to 21, inclusive, are provided. In Figures 16 to 21, inclusive, these partitions are produced in the half blocks by the flow of the molten glass under pressure into the notches 37—a in the bottoms of the plungers as in Fig. 6. Evidently three or even more of such partitions may be thus formed when the blocks are required to resist extraordinary compression in the walls.

In molding blocks which have very thin walls it may be advantageous to prevent the forming of partial vacuums in their interior cells. In this case and for this purpose the mold caps 40 have at both ends the small downwardly extending prisms 40—a which leave small notches in the rims of the half blocks at this point. These notches coincide in the halves and, after welding, leave small vents through which air may pass thus preventing the formation of vacuums.

In the prevailing custom the exposed surfaces of the blocks, and often the interior surfaces as well, have a multiplicity of small ridges or sinuous corrugations formed thereon. It is obvious that the mold bottoms or plunger bottoms, or both, in the above described members may be machined so as to form these corrugations.

In Figures 16 to 22, inclusive, are shown some of the glass blocks now commonly used as made by the hereinbefore described machine. The small protuberances 120, Figures 17 and 19, are caused by the excess amount of glass in the beveled rim edges 121 of the block halves to be welded, as shown in Figs. 16 to 18. With properly designed mold caps the welded joints should be scarcely discernible.

In the block shown in Fig. 19. the halves Fig. 18, are similar in every respect while in those shown in Fig. 17, the halves, Fig. 16, are dissimilar, one including the outer wall surface and the other the inner wall surface and ends.

For making blocks having curved wall surfaces of very long or very short radii, the manner shown in Fig. 16 would be difficult or impracticable. To overcome this difficulty these curved blocks, or others of any desired design, are made as shown in halves in Fig. 21 and in section in Fig. 20 or 22. By this method the molds and half blocks are alike for every design, the welded joint being in a plane midway between the plane surfaces and parallel thereto. In this case the curved walls are formed by the mold shells, each having a slight draft for freeing the halves. The welding in this manner of marketable blocks at a non-prohibitive cost is practicable by the hereinbefore described method of autogenous welding and by no other method.

I claim:

1. In a pressing and welding machine for making hollow glass blocks a common base upon which are mounted two machines in co-active relation, one to the other, and comprising automatically actuated and synchronized mold carrying members mounted upon horizontal axes and rotated in progressively intermittent quarter turns, sliding mold members mounted 90° apart around each of said carrying members, and positioned so that one mold in each carrier is at the top of the carrier and the same two molds are moved by the next step of the carriers to the adjacent sides of the carriers, means for adjusting the angular position of the two carriers and for locking them in working positions during the pressing, welding and ejecting operations with the adjacent molds of the two carriers in alignment.

2. In a pressing and welding machine for making hollow glass blocks comprising a pair of co-acting mold carriers, means for intermittently rotating said carriers upon horizontal axes in quarter turns, housings in said carriers in quadrantal circumferential spacing within which are slidably contained mold shells, mold bottoms and ejectors, adapted to mold a half block, and means for actuating the slidable members in adjacent housings in the two carriers during the period of rest to protrude all said members simultaneously until the half blocks carried thereby contact and are welded, and then to retract the mold shells and bottoms, leaving the welded block supported by the ejectors, and finally to withdraw the ejectors and discharge the block.

3. In a pressing and welding machine for making hollow glass blocks a pair of co-acting mold carriers, means to rotate the carriers intermittently in quarter turns and successive rest periods, quadrantally disposed housings in said carriers having therein slidable mold members comprising outer shells and inner mold bottoms which are bound together, ejectors mounted to slide within certain limits between the said outer shells and mold bottoms, synchronized pneumatic means for protruding the said sliding members as a unit, ratchet and pawl means for holding the ejectors in their protruded positions during the recession of the said shell and bottom members and pins for releasing the pawls from the ratchets at the end of the recession of the shell and bottom members which at that time depress the said pins for the purpose stated.

4. In a pressing and welding machine for making hollow glass blocks the combination of a non-rotative disk having a pair of ports which register with similar ports in radial lines in an intermittently rotating member during the period between intermittent movements of said member, said disk being in close contact with the rotative member and held thereagainst by a spring, a pair of cylinders having inlets connected to pipes from a pneumatic timing valve and outlets through the ports in the disk, pistons within said cylinders having stems which contact with and react against a fixed member thereby causing extra pressure of the disk against the said rotative member during the said periods of time, as controlled by the timing valve.

5. Apparatus for forming blocks comprising two molds, each having an open side, means to form a half block in each mold from plastic glass, means to position the molds with their open sides towards each other, means to project the molds rectilinearly towards each other until the half blocks therein contact and weld together, and means to withdraw the molds rectilinearly from the welded block.

6. Apparatus for forming hollow blocks comprising two mold carriers mounted upon parallel horizontal axes, a multiplicity of molds mounted on each carrier and facing outward on the periphery thereof, means for moving the two carriers intermittently and synchronously, means for stopping each movement of the carriers with the molds on the adjacent sides of the carriers in alignment therewith, means for molding a half block from plastic glass in each mold before it reaches said position of alignment with the mold on the other carrier, means to move the two molds rectilinearly in said position of alignment towards each other until the half blocks therein are brought in contact, whereby said half blocks are welded to complete a block, and means for ejecting the finished blocks from the molds and for depositing the blocks upon a conveyor.

7. Apparatus for forming blocks comprising two molds, each having an open side, means to form a half block in each mold from plastic glass, means to position the molds with their open sides towards each other, means to project the molds in said position until the half blocks therein contact and weld together, means to withdraw the molds from the welded block, a block support movable vertically beneath the position of the welded block, and means to raise and lower said support in timed relation with the movement of the molds to position it in its upper position when the molds are moved apart and thereafter lower it with the block thereon.

8. Apparatus for forming hollow blocks comprising two mold carriers mounted upon parallel horizontal axes, a series of molds mounted on each carrier and facing outward on the periphery thereof, means for moving the two carriers intermittently and synchronously, means for stopping each movement of the carriers with the molds on the adjacent sides of the carriers in alignment with each other, means for molding a half block from plastic glass in each mold before it reaches said position of alignment with the mold on the other carrier, each mold comprising a shell surrounding the sides of the half block and an ejector contacting the bottom of the half block in the position in which it is originally formed, means to move the two molds in said position of alignment towards each other until the half blocks therein are brought in contact, whereby said half blocks are welded to complete a block, and means for separating the two mold shells after the block halves are welded together and thereafter withdrawing the ejectors from contact with the block.

9. Apparatus for forming hollow blocks comprising two mold carriers mounted upon parallel horizontal axes, a series of molds mounted on each carrier and facing outward on the periphery thereof, means for moving the two carriers intermittently and synchronously, means for stopping each movement of the carriers with the molds on the adjacent sides of the carriers in alignment with each other, means for molding a half block from plastic glass in each mold before it reaches said position of alignment with the mold on the other carrier, each mold comprising a mold shell, a mold bottom, and an ejector surrounding the mold bottom within the mold shell, means to move the two molds in said position of alignment towards each other until the half blocks therein are brought in contact, whereby said half blocks are welded to complete the block, and means for projecting the mold shell and bottom together and separately operating the ejector.

10. Apparatus for forming hollow blocks comprising two adjacent rotary mold carriers, a multiplicity of equally spaced outwardly open molds on each carrier, means for rotating the carriers intermittently and synchronously in opposite directions, rectilinearly reciprocating means for bringing into contact and receding the molds in the two carriers while they are in adjacent, welding, positions, plunger means for forming the half blocks at 90° spacing from their welding positions, and means for ejecting the welded blocks and for delivering them to a conveyor.

11. Apparatus for forming hollow glass blocks comprising two adjacent rotary mold carriers, a multiplicity of equally spaced outwardly opening molds in each carrier, means for rotating the two carriers intermittently and synchronously, rectilinearly reciprocating means for bringing into contact and receding the molds in the carriers while they are in adjacent positions for welding the glass, plungers for forming half blocks in two molds, one mold on each carrier simultaneously while they are in their pressing position, and mold caps having beveled surfaces contacting the glass and sliding on said plungers for shaping the beveled rim edges so that their inner sides extend farther from the molds than their outer sides which are flush with the molds.

12. In an apparatus for forming and welding glass blocks comprising two adjacent mold carriers each with a multiplicity of molds, plungers for forming glass block halves, mold caps sliding upon said plungers and having on their surfaces contacting the rim edges of the half blocks projections to form notches therein, the notches in each half block registering during welding so as to form a vent in the block wall, means for projecting the two adjacent molds rectilinearly towards each other until the half blocks therein contained contact and weld together, and means to cause rectilinear recession of the welding molds and to release the finished blocks.

13. Apparatus for forming hollow glass blocks comprising two adjacent mold carriers mounted side by side upon parallel axes, a multiplicity of molds in each carrier opening outwardly on the periphery of the carrier, each mold comprising a shell sliding within a socket in the carrier and adapted to surround the closed sides of a half block formed in the mold, synchronized means for sliding adjacent mold shells of the two carriers together to weld a pair of half blocks together, a separately operated ejector within each shell and adapted to contact the closed side of each half block in the position in which it was originally formed, synchronized means for separating the mold shells after the block halves are welded together and thereafter withdrawing the ejectors from contact with and thus releasing the welded block, synchronized plunger means for forming the half blocks in the top molds of each carrier, and means for rotating the two carriers intermittently and synchronously.

14. Apparatus for forming and welding glass blocks comprising two adjacent carriers rotatable about horizontal axes each with a multiplicity of radially sliding mold parts, means for forming a half block in the top mold of each carrier, means for welding the half blocks formed in one carrier to those formed in the adjacent carrier and for ejecting the finished blocks, the forming means including plunger and sliding cap means, the cap means having beveled edges for forming beveled edges on the block rims, thus providing surplus material on the inside of said rims, and intermittent synchronized means for operating the forming and welding mechanisms and for rotating the carriers.

15. Apparatus for forming and welding glass blocks comprising two adjacent carriers rotatable about horizontal axes each with a multiplicity of radially sliding mold parts, means for forming a half block in the top mold of each carrier, means for welding the half blocks formed in one carrier to those formed in the adjacent carrier and for ejecting the finished blocks, the forming means including plunger and sliding cap means, the cap means having downward projecting parts for forming notches in the half block rims, said notches registering during the welding thus forming a vent in a wall of the finished block and synchronized means for intermittently operating the forming and welding mechanisms and for rotating the carriers.

16. The method of making hollow glass blocks comprising molding from hot plastic glass two similar block halves, each in a sourrounding mold with an open side and each forming a box-like body with an open side at the open side of the mold and with the wall of the box projecting from the mold at its inner face while its outer face is flush with the mold, thus forming beveled edges, and subsequently bringing the open sides of the molds together in rectilinear motion, and forcing said beveled edges together while they are at welding temperature thereby welding the half blocks together, and causing a surplus of glass to be extruded inwardly thereby forming a bead on the inside of the welded junction, and thereafter releasing the finished block by rectilinear recession of the two molds.

WILBUR S. MAYERS.